United States Patent
Ress, Jr.

(10) Patent No.: US 8,950,069 B2
(45) Date of Patent: Feb. 10, 2015

(54) INTEGRATED COMPRESSOR VANE CASING

(75) Inventor: Robert A. Ress, Jr., Carmel, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1807 days.

(21) Appl. No.: 12/004,548

(22) Filed: Dec. 21, 2007

(65) Prior Publication Data

US 2009/0047126 A1    Feb. 19, 2009

Related U.S. Application Data

(60) Provisional application No. 60/877,747, filed on Dec. 29, 2006.

(51) Int. Cl.
  *F01D 17/00* (2006.01)
  *F01D 9/04* (2006.01)
  *F01D 25/24* (2006.01)

(52) U.S. Cl.
  CPC ............. *F01D 9/047* (2013.01); *F01D 25/246* (2013.01); *Y02T 50/671* (2013.01); *F01D 9/041* (2013.01); *Y02T 50/673* (2013.01); *Y10S 415/915* (2013.01)
  USPC ........... 29/889.2; 29/889.22; 29/558; 29/460; 29/402.19; 164/47; 164/76.1; 415/144; 415/145; 415/915; 415/173.4; 415/173.7; 415/174.4; 415/174.5; 415/193; 415/209.2; 415/210.1; 415/191

(58) Field of Classification Search
  USPC ................. 415/138–139, 173.4–173.5, 173.7, 415/174.4–174.5, 189–191, 193, 208.2, 415/209.1–209.4, 210.1, 144–145, 915; 29/889.2, 889.21, 889.22, 889.23, 557, 29/558, 460, 402.18; 164/47, 76.1
  See application file for complete search history.

(56) References Cited

U.S. PATENT DOCUMENTS

| | | | | | |
|---|---|---|---|---|---|
| 3,314,653 | A | * | 4/1967 | Bell | 415/191 |
| 3,748,056 | A | * | 7/1973 | Nakanishi et al. | 415/115 |
| 3,751,180 | A | * | 8/1973 | Cameron | 415/915 |
| 4,245,951 | A | * | 1/1981 | Minnich | 415/139 |
| 4,264,274 | A | | 4/1981 | Benedict | |
| 4,405,284 | A | * | 9/1983 | Albrecht et al. | 415/174.4 |
| 4,502,276 | A | | 3/1985 | Pask | |
| 5,114,159 | A | | 5/1992 | Baird et al. | |
| 5,346,362 | A | * | 9/1994 | Bonner et al. | 415/191 |
| 5,531,565 | A | * | 7/1996 | Meindl et al. | 415/144 |
| 5,653,581 | A | | 8/1997 | Dixon et al. | |
| 5,655,876 | A | * | 8/1997 | Rock et al. | 415/139 |
| 5,899,660 | A | | 5/1999 | Dodd | |
| 6,148,518 | A | * | 11/2000 | Weiner et al. | 29/889.2 |
| 6,202,302 | B1 | | 3/2001 | Descoteaux | |
| 6,220,815 | B1 | * | 4/2001 | Rainous et al. | 415/174.5 |
| 6,530,744 | B2 | * | 3/2003 | Liotta et al. | 415/115 |
| 6,547,522 | B2 | * | 4/2003 | Turnquist et al. | 415/173.3 |
| 7,094,029 | B2 | | 8/2006 | Taylor et al. | |
| 7,284,955 | B2 | * | 10/2007 | Vieillefond et al. | 415/190 |
| 2002/0044868 | A1 | * | 4/2002 | Marx et al. | 415/191 |
| 2003/0206799 | A1 | * | 11/2003 | Scott | 415/209.3 |
| 2003/0233822 | A1 | * | 12/2003 | Albrecht et al. | 60/39.091 |
| 2004/0067131 | A1 | * | 4/2004 | Joslin | 415/139 |
| 2004/0179939 | A1 | * | 9/2004 | Bluhm et al. | 415/209.4 |

* cited by examiner (Continued)

*Primary Examiner* — Christopher Verdier (74) *Attorney, Agent, or Firm* — Krieg DeVault LLP (57) ABSTRACT

A low leakage, integral fixed vane system for a gas turbine engine compression system which can accommodate the latest 3-D aerodynamic airfoil geometries and provide endwall ovalization control. A unitized construction wherein the vanes are integral with the case wall in the compression system.

4 Claims, 8 Drawing Sheets

INTEGRATED COMPRESSOR VANE CASING

PRIORITY CLAIM

This application claims the benefit of U.S. Provisional Application No. 60/877,747, filed Dec. 29, 2006, which is hereby incorporated by reference in its entirety.

TECHNICAL FIELD

The present invention relates generally to compressor case assemblies, and more particularly to a system and method of providing fixed vane systems for gas turbine engine compression systems.

BACKGROUND

Fixed compressor vane assemblies utilized in current production large military and civil powerplants are typically mounted to an intermediate structure which is then tied to the compressor case wall. These case-tied designs are utilized in an attempt to isolate the flowpath endwall from case distortions brought on from carcass bending loads and the asymmetric radial growth of a horizontally split compressor case. The case-tied designs also attempt to control outer endwall displacement in line with radial blade tip growth in order to minimize tip clearance throughout the flight envelope. After having been properly matured, these designs have generally provided acceptable performance characteristics.

The compressor vane assembly designs employed in current practice are, however, generally very complex. They rely on individual or segmented vane assemblies, full ring or split intermediate structures, a multitude of seal elements and a separate outer case assembly. This complex architecture has proven to be heavy and costly. In addition, the number of interfaces in this complex architecture results in multiple potential leak paths at the outer endwall which are difficult to seal. Even a well sealed design can degrade with time as seal interfaces wear. The multiple leak paths can result in recirculation at the outer endwall resulting in operability issues. In addition to high initial cost, the case-tied architecture results in high maintenance costs as wear at retaining hooks and seal interfaces must be addressed.

Accordingly there is a need for a unique and inventive apparatus of a compressor case and vane system.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DETAILED DESCRIPTION

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention is illustrated therein being contemplated as would normally occur to one skilled in the art to which the invention relates.

In one embodiment of the present invention there is a low leakage fixed vane system for a gas turbine engine compression system that can provide endwall ovalization control, among other features. This is preferably accomplished through the introduction of a compressor vane and casing design which combines the two in a unitized fashion. The integrated compressor vane casing moves away from the multi-piece construction found in typical vane and case designs to a unitized construction wherein the vanes are integral with the case wall. Such a unitized construction may result from a casting operation or any other method of manufacture that provides for the formation of both compressor vane casing and compressor vane(s) as a unitary whole. Other configurations, components, and combination of components may be included or otherwise substituted in the unitized construction. A unitized construction may result in multiple vane casings making up the fixed geometry section of a compression system. For example, an integral casing and vane corresponding to a first stage of a compression system (absent the rotating airfoils) made according to the unitized constructions disclosed herein may be connected to an integral casing and vane corresponding to a second stage (absent the rotating airfoils). In some embodiments, more than one stage (absent the rotating airfoils) may be integrally formed.

Figure 1:
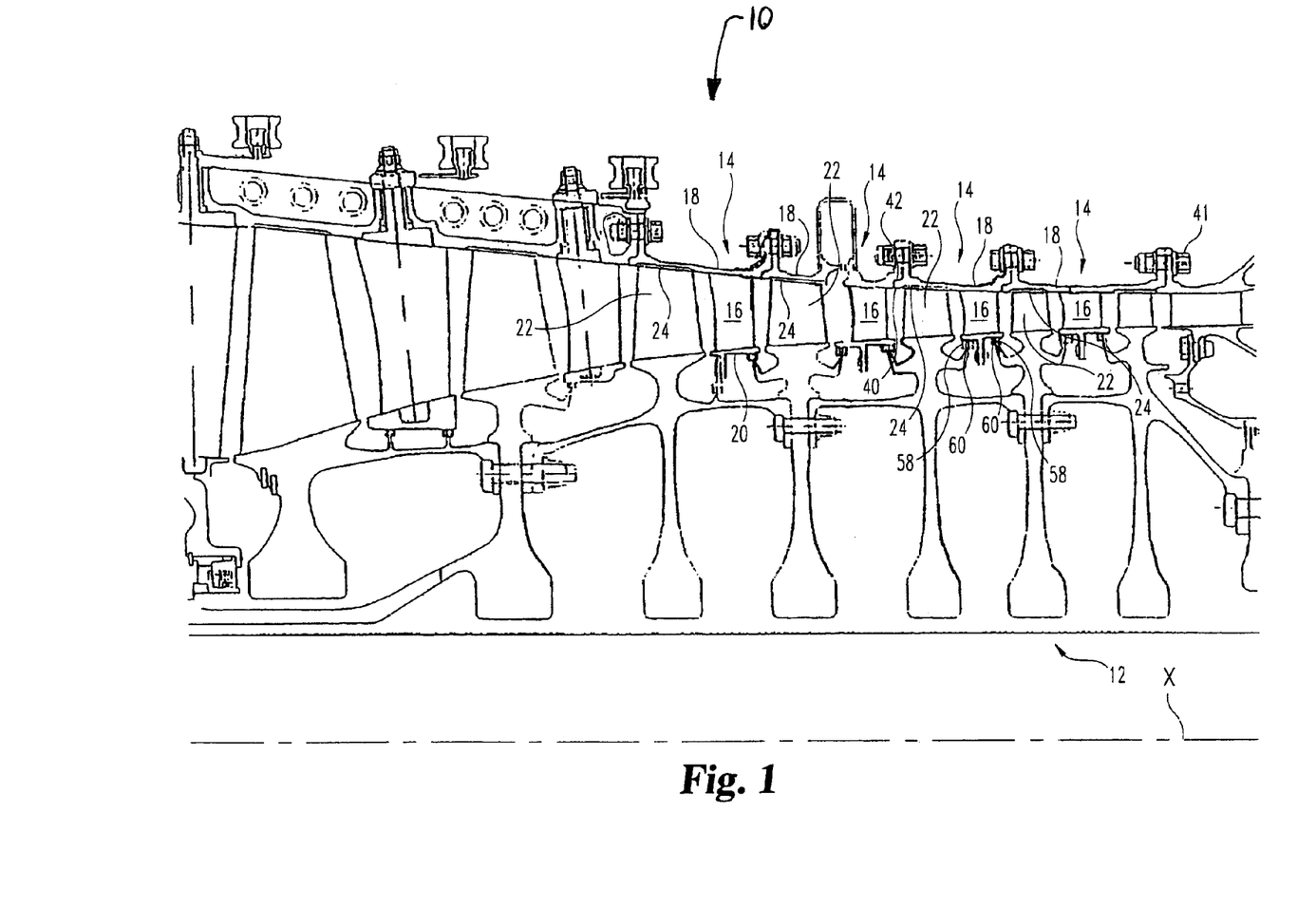
FIG. 1 is a cross-sectional view of a portion of a compressor vane casing that includes integrated compressor vane casing segments.

A compressor containing four stages of integrated compressor vane casings is illustrated in FIG. 1. Referring to FIG. 1, a cross-sectional view of a portion of a compressor vane casing 10 for a compressor system 12 is illustrated along centerline X that includes a plurality of integrated vane casing segments 14. The compressor vane casing 10 moves away from the multi-piece construction found in typical vane and case designs to a unitized construction where vanes or airfoils 16 of the compressor vane casing 10 are integral with or made an integral part of an outer case wall 18. Each integrated vane casing segment 14 may span one compressor blade and vane row in the compressor system 12. This may result in multiple integrated vane casing segments 14 making up a fixed geometry section of the compression system 12. A compressor system 12 containing four stages of integrated compressor vane casing segments 14 is illustrated in FIG. 1. Some embodiments of the present application, however, may have any number of stages whether or not such embodiments are depicted in the figures herein.

In some embodiments, the integrated vane casing segment 14 may span more than one compressor blade and/or vane row. For example, the vane casing segment 14 may span a blade row upstream of a vane row as well as span a blade row downstream of the vane row.

Figure 2:
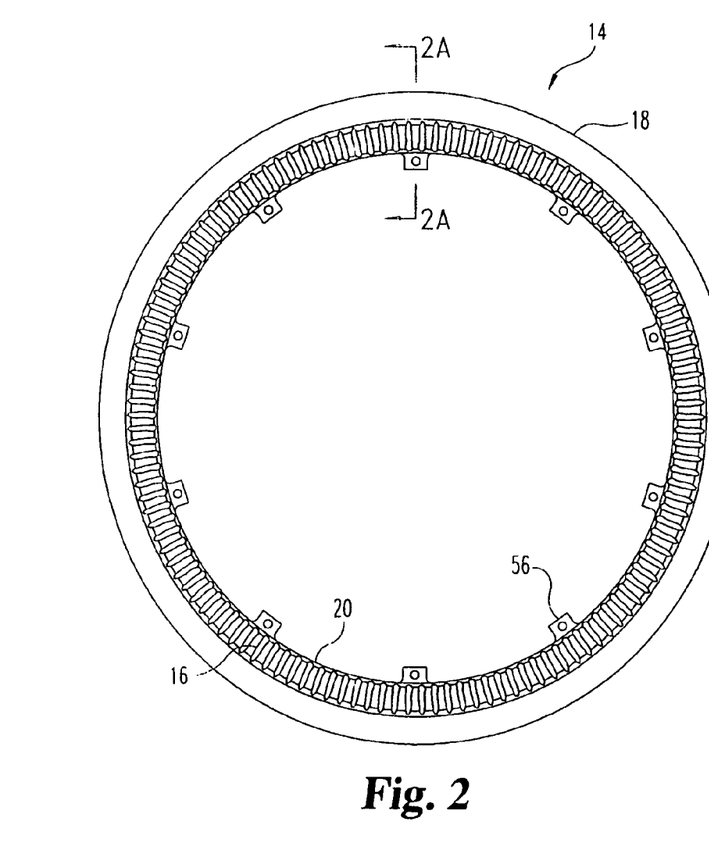
FIG. 2 is a cross-sectional front view of a portion of an integrated compressor vane casing segment.
Figure 2A:
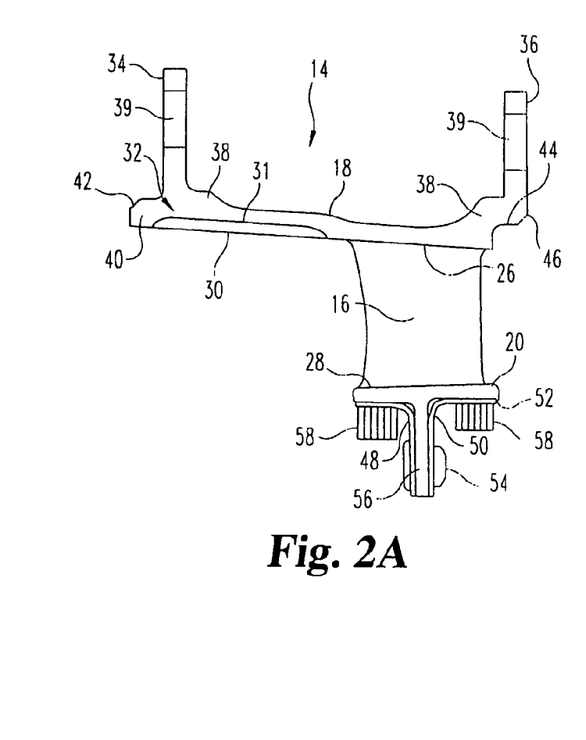
FIG. 2A is a cross-sectional view along line 2A-2A in FIG. 2.

Each integrated vane casing segment 14 may comprise a circular or 360 degree casing that may include the outer case wall 18, the airfoils 16, and a vane inner shroud 20 as illustrated in FIG. 1. In some embodiments, however, other components may be included or otherwise substituted in the integrated vane casing segment 14. In addition, some components of the illustrative embodiment may be removed entirely. For example, some or all of airfoils 16 may not be included in some embodiments. The outer case wall 18 projects ahead of a respective blade row 22 of the compressor system 12 covering a blade tip 24 of the blade row 22. Referring to FIG. 2, a cross-sectional front view of a portion of an integrated vane casing segment 14 is set forth. As set forth above, the integrated vane casing segment 14 may comprise a circular casing that may include the outer case wall 18, the vanes 16, and the vane inner shroud 20. Referring to FIG. 2A, an upper portion 26 of the vanes 16 is preferably integral with the outer case wall 18 and a lower portion 28 of the vanes 16 may be connected with the vane inner shroud 20.

Referring to FIG. 2A, which sets forth a cross-sectional view along line 2A-2A in FIG. 2, the integrated vane casing segment 14 may include an abradable tip portion 30 that may be positioned within a recess 31 in the outer case wall 18. In some embodiments, the abradable tip portion 30 may not cover the entire length of recess 31, or may not fill in the entire depth of the recess 31. In other embodiments, the recess 31 in the outer case wall 18 may be absent from the forward extension area 32. The abradable tip portion 30 may be plasma sprayed onto the integrated vane casing segment 14 and preferably comprises a material such as CoNiCrAlY BN polyester, but other materials may be used. The abradable tip portion 30 may also be a separate structure that is attached or otherwise secured to the vane casing segment 14. The abradable tip portion 30 is located in the forward extension area 32 of the integrated vane casing segment 14, but may be located in other areas as well. Referring to FIGS. 1 and 2A, the abradable tip portion 30 allows for blade tip 24 rubs resulting from changes in relative position between the blade tip 24 and abradable tip portion 30.

As further illustrated in FIG. 2A, the outer case wall 18 may include a forward flange 34 and a rear flange 36 that protrude upwardly from an upper surface 38 of the outer case wall 18. Some embodiments may only have one of the flanges 34, 36 integrally formed in the structure. The forward flange 34 and rearward flange 36 can be used to connect to other of flanges 34 and 36, or other suitable structure. For example, a rearward flange 36 may be used to connect to a diffuser section, to set forth just one nonlimiting example.

Referring to FIGS. 1 and 2A, the flanges 34, 36 may include an aperture 39 that receives a fastener 41, such as a bolt and nut, which is used to interconnect respective integrated compressor vane casing segments 14 together. In some embodiments, however, the flanges 34, 36 may not include an aperture 39. In these embodiments, other techniques of fastening respective integrated compressor vane casing segments 14 together may be used. For example, respective segments 14 may be fastened by welding, to set forth just one nonlimiting example. A male engagement section 40 may be included at a forward end 42 of the outer case wall 18 and a female engagement section 44 may be included at a rear end 46 of the outer case wall 18. In some embodiments the male and female engagement sections 40 and 44 may not be integrally formed in the vane casing 14. In other embodiments, a vane casing 14 may include a male engagement section 40 but not the female engagement section 44, or vice versa. Referring to FIG. 1, when the compressor vane casing 10 is assembled, respective male engagement sections 40 may be connected with respective female engagement sections 44 such that the respective engagement sections 40, 44 overlap thereby preferably providing a fluid tight seal between respective integrated compressor vane casing segments 14.

Referring to FIG. 2A, the integrated compressor vane casing segments 14 may include a first and second interstage seal assembly 48, 50 that may be positioned below a lower surface 52 of the inner shroud 20. A fastener 54, such as a bolt and nut for example, may be used to retain the interstage seal assemblies 48, 50 at a local tab 56 that protrudes downwardly from the inner shroud 20. As will be apparent from FIG. 2, the local tab 56 may not be present immediately below each of the vanes 16. The interstage seal assemblies 48, 50 may include a seal 58 that protrudes downwardly from the integrated compressor vane casing segment 14. Other means of retention commonly utilized for seal assemblies can also be employed. Referring to FIGS. 1 and 2A, the seals 58 of the interstage seal assemblies 48, 50 allow for rotating knife edge seal 60 rubs of the compressor system 12.

The compressor casing 10 may be made lightweight due to its unitized construction, but some embodiments may not be lightweight. The casting is preferably produced through an investment casting process, but may be produced through other techniques. The investment casting process is preferably, though not exclusively, followed by a hot isostatic pressing operation. Airfoil surface finish is preferably achieved through a vibratory finishing system, but other processes may also be used. In one form, minimal machining is required to produce the final assembly. In some embodiments, however, numerous machining processes may be employed to suit a particular specification or requirement. The outer case wall is preferably left as cast, but some embodiments may process the outer case wall further. The flanges, inner shroud ID and the forward extension ID are preferably lathe turned, but may be processed by other techniques as well. The bolt holes and any seal assembly fastener holes are preferably drilled, but also may be integrally formed among other techniques. The vane inner shrouds are preferably wire cut, such as electrical discharge machining, or water jet cut to introduce damping resulting from relative motion between the inner shroud segment and the sheet metal seal assembly. For example, wire electrical discharge machining may be used in some embodiments. Other processing operations are contemplated herein. As such, the compressor casing 10 may be manufactured having a lighter weight than traditional casings and may furthermore be capable of being manufactured at a lower cost. The integrated compressor vane casing design may be lightweight due to its unitized construction. Subsequent processing steps including hot isostatic pressing, vibratory finishing and final machining are also low cost operations.

Figure 2B:
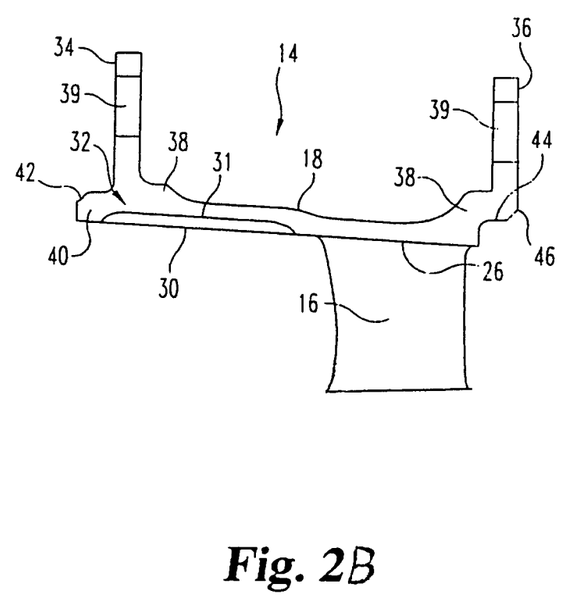
FIG. 2B is a cross-sectional view of another embodiment of the present application without an inner shroud.

With reference to FIG. 2B, there is illustrated another embodiment of the present application. The embodiment set forth in FIG. 2B is substantially similar to the embodiment described above with reference to FIG. 2A, however each of the vanes 16 are cantilevered. The embodiment set forth with the assistance of FIG. 2B does not include a vane inner shroud.

Figure 3:
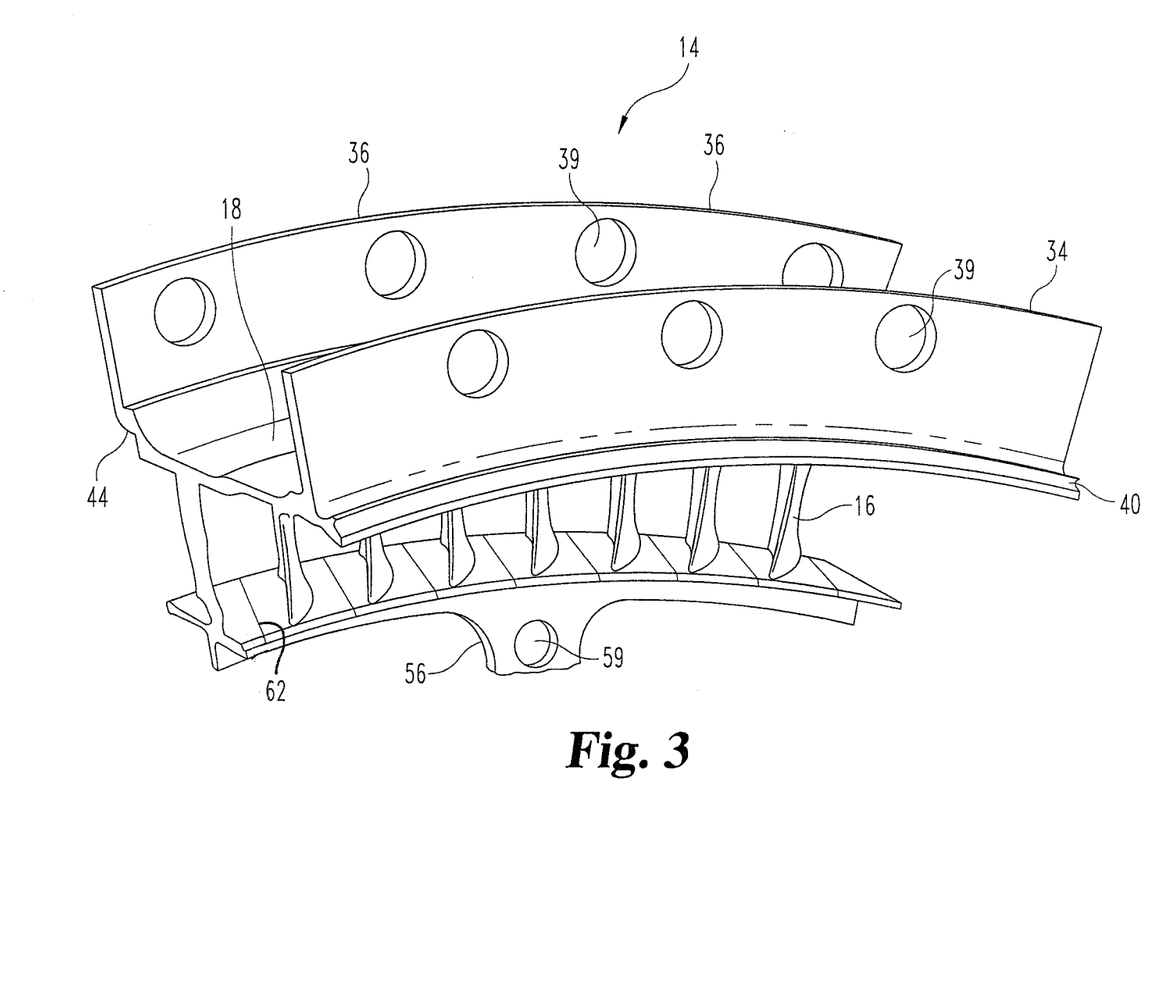
FIG. 3 is a perspective view of a portion of an integrated compressor vane casing segment.

FIG. 3 shows manufacturing details of one embodiment of the integrated vane casing. Referring to FIG. 3, which depicts a portion of an integrated compressor vane casing segment 14, the integrated compressor vane casing segment 14 may be produced or manufactured through an investment casting process that may be followed by a hot isostatic pressing operation.

The outer case wall 18 is preferably left as cast. The flanges 34, 36, the inside diameter of the inner shroud 20 and the upper surface 38 may be lathe turned. Apertures 39 in preferably turned flanges 34 and 36, and aperture 59 in seal land retaining tab 56, and any other seal assembly fastener holes may be drilled. The inner shrouds 20 may include a cut 62 that may be wire or water jet cut to introduce damping resulting from relative motion between the inner shroud 20 and the sheet metal assembly.

Figure 4:
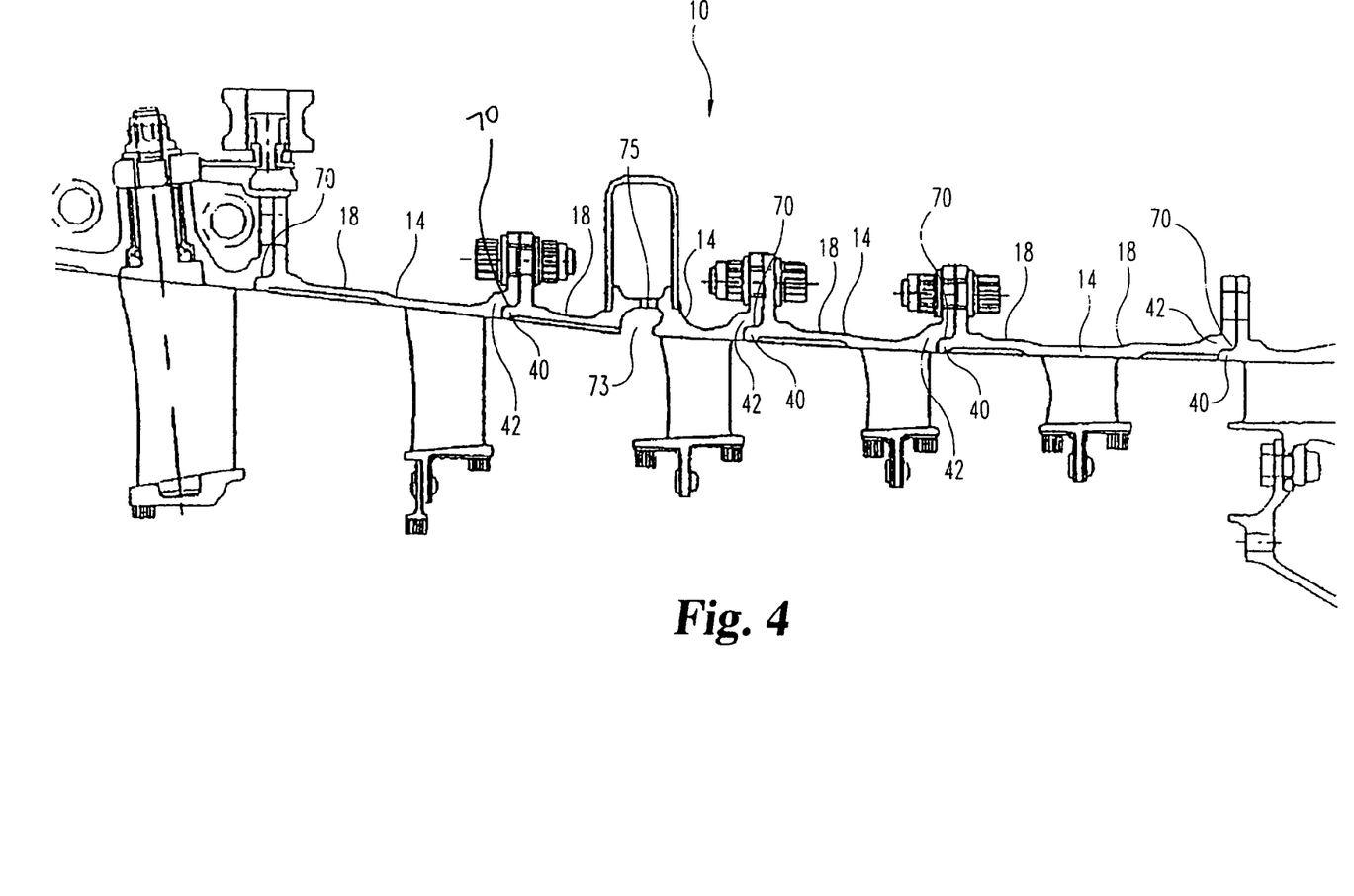
FIG. 4 is a cross-sectional view of a portion of a compressor case including a plurality of integrated compressor vane casing segments.

The integrated compressor vane casing segments 14 offer performance advantages in that the casting approach allows for unrestricted aerodynamic airfoil shapes. Additionally, the 360 degree integrated compressor vane casing segments 14 offer excellent ovalization control due to the fact that the full ring casing inherently retains its shape especially with the end flanges 34, 36 acting as round-up rings. Finally, the design possesses no outer endwall leakage as is common in multi-wall designs as no leak path exists. The stacked ring casing design at the rear of the compressor eliminates the leak prone horizontal split line found in single wall compressor cases. As used herein, the term "stacked ring" refers to a series of integrated compressor vane casing segments 14 assembled together to form a stack of casing segments 14. As is illustrated in FIG. 4, the pilot fits 70 are held tight at assembly and remain tight during operation to eliminate and/or minimize flange leakage thereby maximizing performance. The pilot fits 70 are formed by the overlapping engagement of the male and female engagement members 40, 44 of interconnected integrated compressor vane casing segments 14.

The cast approach to the integrated compressor vane casing preferably provides a wide range of flexibility in selecting a material system. Fixed vane systems in current production large military and civil powerplants typically utilize nickel alloy materials such as INCONEL 718, which is available from Inco Alloys International, Inc., 3200 Riverside Drive, Huntington, W. Va., 25720. This class of material possesses the necessary strength, corrosion resistance and temperature capability required by these current products. Higher pressure ratio compression systems require material systems more capable than those traditionally used for fixed vane systems. Compression systems for high Mach number propulsion systems also require material systems more capable than those traditionally used for fixed vane systems.

Various materials may be used to make the integrated compressor vane casing segments. In some applications, high temperature capable nickel based systems may be used. For applications where weight reduction is of prime importance, titanium aluminide may be a viable option. In some embodiments of the present application, different materials may be incorporated in the individual casing elements that make up a stacked ring assembly. For example, conventional titanium can be utilized in regions ahead of a titanium fire line—the location where sustained combustion of titanium would occur. Behind the fire line, burn resistant titanium or nickel can be utilized. For high Mach number propulsion systems, titanium aluminide can be utilized in the forward stages while a nickel based material can be utilized in the latter stages as temperatures exceed the limits of titanium aluminide.

In some embodiments the integrated compressor vane casing segments may incorporate flow control features. Flow control may become a significant technology in future power plants. In one embodiment, flow control is preferably implemented via a network of internal flow channels introduced into the vane airfoil. These flow channels are utilized to implement various types of flow control including suction side bleed and trailing edge blowing. Suction side bleeding has been shown to increase loading levels and efficiency and also act as a source for reinjecting flow upstream for stability control of rotors. In addition to performance and operability benefits, trailing edge blowing has been shown to greatly reduce the forcing function on downstream blades leading to improved durability. This technology can also be used to change the stage matching of the compressor to allow optimum operation at off-design conditions creating a versatile core for multiple applications. The casting approach of the integrated compressor vane casing allows for the introduction of these flow channels through a cored airfoil investment casting approach as is done with cored turbine blade and vane castings.

Figure 5:
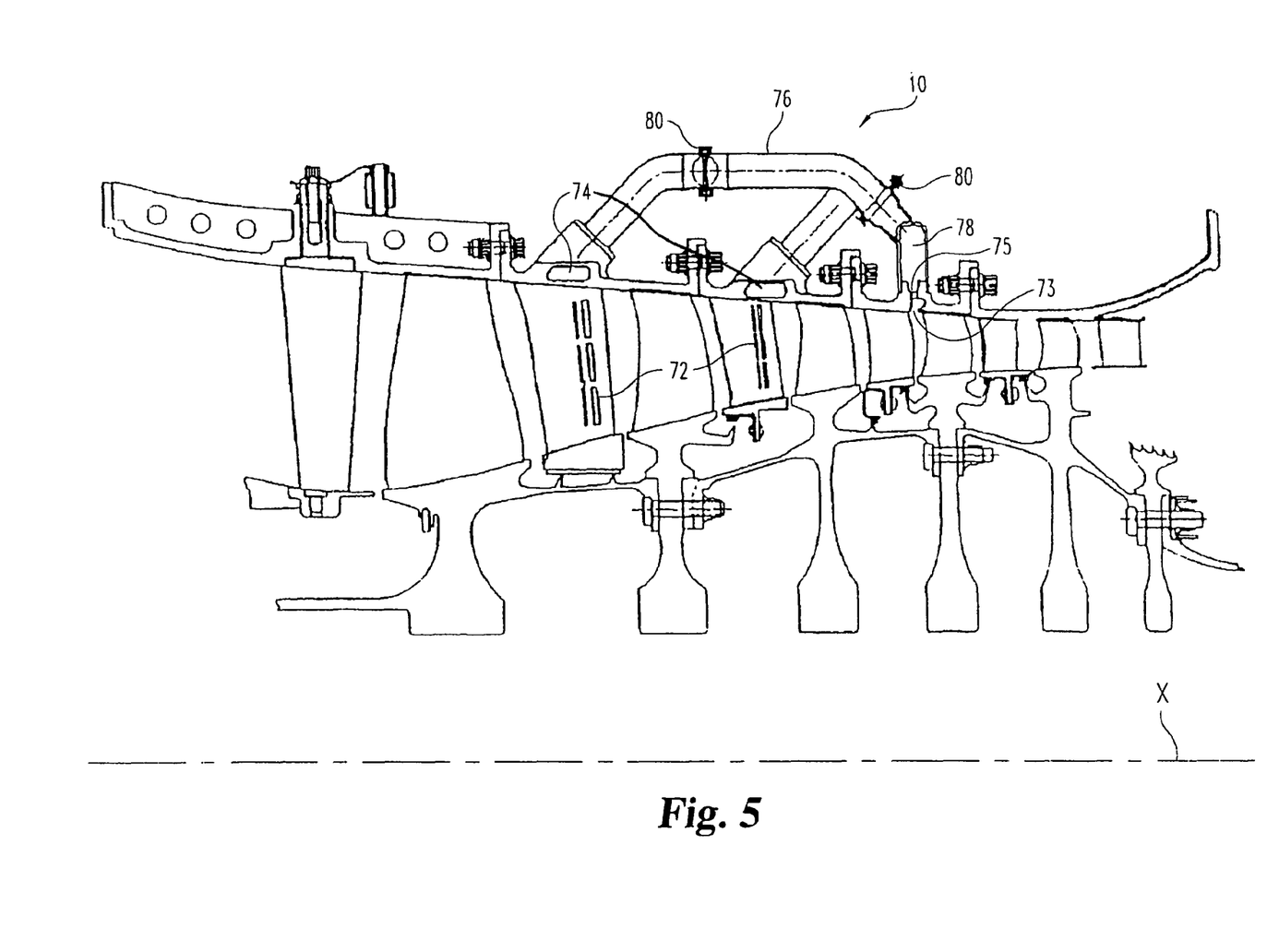
FIG. 5 is a cross-sectional view of a compressor case having flow control features.

A compression system incorporating flow control within the integrated compressor vane casing is illustrated in FIG. 5. Referring to FIG. 5, a network of internal flow channels (not shown) may be introduced, cut, or otherwise formed into respective vanes 16. An aperture 72 is formed in the external surface of the vanes 16 to provide a conduit between the internal flow channels (not shown) to the air stream traversing through the compressor. The outer case 18 may include an integral flow control feed manifold 74. In some embodiments, however, the outer case 18 may not include the flow control feed manifold 74. The internal flow channels (not shown) are in fluid communication with the integral flow control feed manifolds 74 in the illustrative embodiment. External plumbing 76 may be used to connect the integral flow control feed manifolds 74 to a flow control pressurization source 78. A cavity 73 may be formed in the outer case wall 18, as well as an aperture 75, to provide bleed air from a stage of the compressor. The bleed air may be used to feed the flow control pressurization source 78. In some embodiments, either or both the cavity 73 and aperture 75 may be included. In other embodiments, neither cavity 73 nor aperture 75 may be included. A control valve 80 may be positioned in the flow path of each respective integral flow control feed manifold 74 to control the flow of fluid between the flow control pressurization source 78 and respective integral flow control feed manifolds 74. The flow channels 72 are utilized to implement various types of flow control including suction side bleed and trailing edge blowing.

Figure 6:
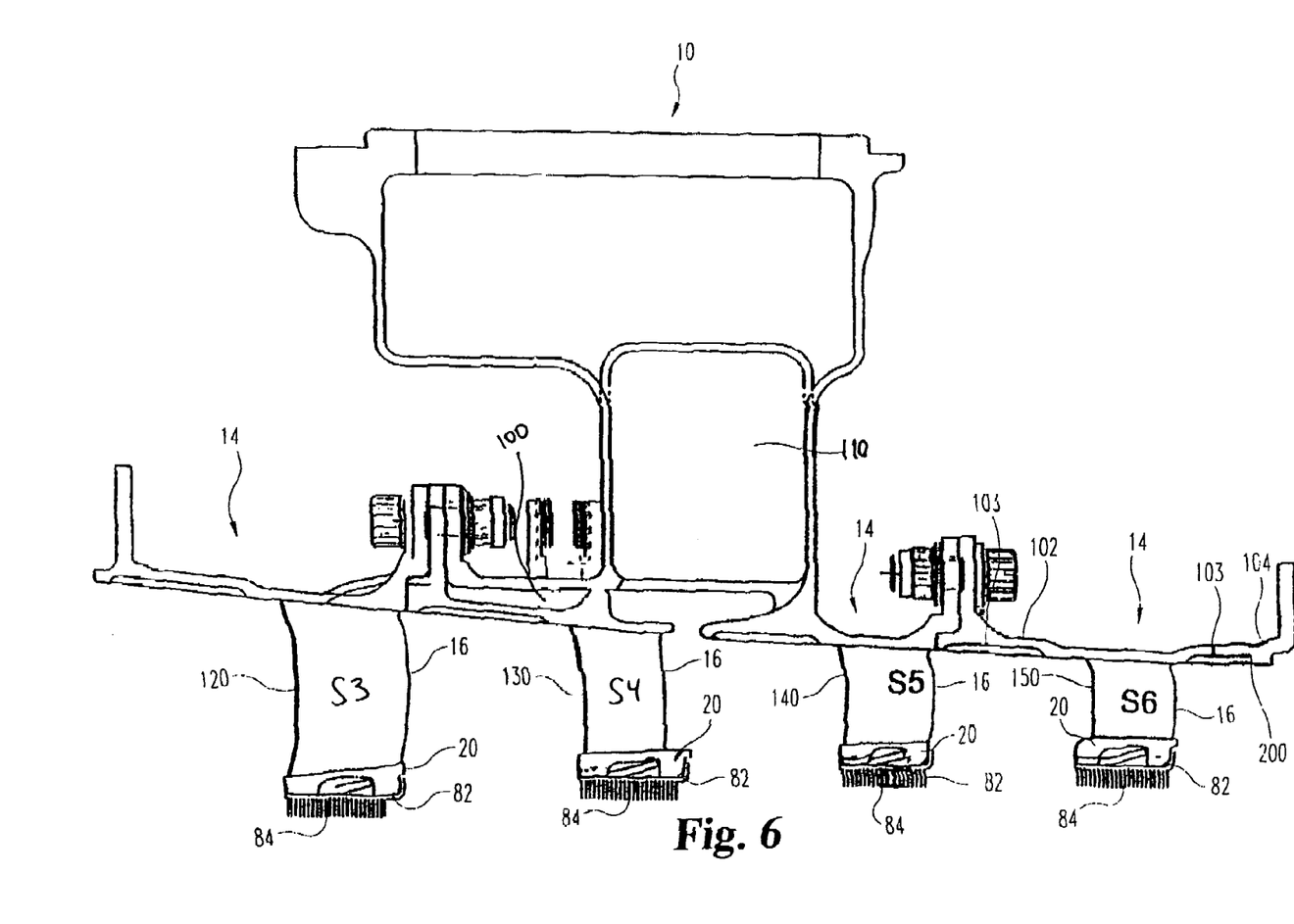
FIG. 6 is a cross-sectional view of a portion of a compressor case according to another embodiment.

Referring to FIG. 6, another illustrative compressor case 10 is illustrated that includes a plurality of four integrated compressor vane casing segments 14 interconnected to one another to form a portion of the compressor case 10. The plurality of vane casing segments may be made out of similar or dissimilar material. As a general rule the vane casing segments in the upstream portion of the compressor may be made of material with a lower temperature capability than the vane casing segments in the downstream portion of the compressor. However, the present application clearly contemplates that all vane casing segments may be made of the same material, different material for each vane casing segment, and/or groups of vane casing segments formed of the same material.

In this example, the inner shroud 20 does not include tab 56 but rather includes a carrier 82 that is connected with a lower surface of the inner shroud 20. Carrier 82 may be a 360° shell that fits tightly against the inner shroud 20. In one form the carrier 82 is installed by cooling the assembly and sliding it axially onto the shroud. When seated a raised lip engages the end of the shroud. A series of spring tabs lock the carrier to the tab. A provision for disengaging the spring tabs is included for disassembly. A honeycomb seal 84 is connected with a lower surface of the carrier 82. The carrier 82 serves to hold the honeycomb seal 84, but also serves as a frictional damper as well.

As illustrated in FIG. 6, there are four stages of 360° integral vane casings S3, S4, S5 and S6 with leading edges 120, 130, 140 and 150, respectively. In one non limiting example, the integral vane casings are manufactured from CAST INCO 718, which is available from Inco Alloys International, Inc., 3200 Riverside Drive, Huntington, W. Va., 25720. In various operating conditions the temperature of leading edge 120 of vane casing S3 might be about 517° F., the temperature of leading edge 130 of vane casing S4 might be about 634° F., the temperature of leading edge 140 of vane casing S5 might be about 751° F., and the temperature of leading edge 150 of vane casing S6 might be about 868° F. The third stage sump seal pressurization air 100 would also be about 517° F. The fourth stage customer and start bleed plenum 110 would have a temperature of about 634° F. However, the present invention is not limited to the above temperatures and/or materials. As discussed above, different integrated compressor vane casing segments within a stacked ring assembly may be made from different materials to accommodate the variety of operating temperatures discussed above. For example, integral vane casing S3 may be made from a different material than integral vane casing S5.

Also of note in FIG. 6, integral vane casing S6 includes a forward extension 102 and a rearward extension 104. Though many embodiments disclosed herein include a forward extension similar to forward extension 102, some embodiments also include rearward extensions 104. Each of extensions 102 and 104 may include a recess 103. In some embodiments an abradable tip portion may be positioned within the recess 103. The abradable tip portion may not cover the entire length of recess 103, or may not fill in the entire depth of the recess 103. In some embodiments, the recess 103 may be present in either of extension 102 and 104. In other embodiments, neither of extensions 102 or 104 may include the recess 103.

As should be understood, the ability to manufacture different portions from different materials is advantageous given the dramatically different temperatures. In one non-limiting example, the blade tracks 200 between stages 6 and 7 might preferably be manufactured from Metco 2043 (CoNiCrAlY) as the temperature there (986° F. in the operating conditions of the above paragraph) is even higher. However, the present application contemplates a great variety of different materials capable of operating at a variety of temperatures as required by the system design.

Figure 7A:
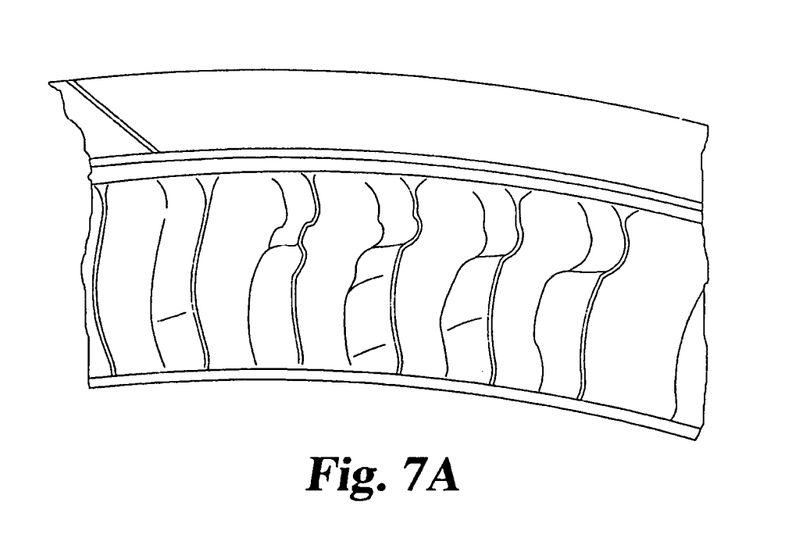
FIGS. 7A and 7B illustrate a plurality of damaged vanes and an electron beam weld repaired vane assembly, respectively.
Figure 7B:
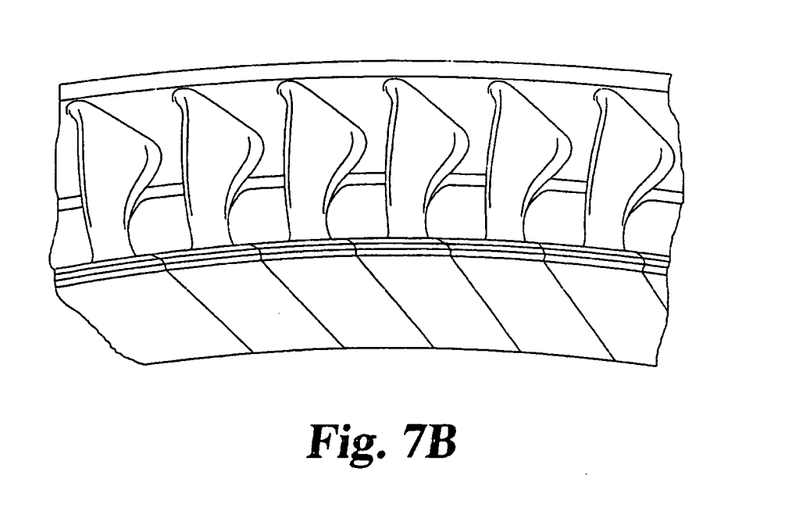

With reference to FIGS. 7A and 7B, it should be understood that foreign and domestic object damage (FOD & DOD) to an integrated vane casing assembly is addressed through standard blade and vane repair techniques. In some applications, however, custom repair techniques might also be used. Light damage is preferably addressed through typical hand blending techniques. Heavy damage is preferably accomplished through welding or powder deposition techniques. The present application further contemplates the utilization of a powder laser deposition process. With reference to FIG. 7A there is illustrated a plurality of damaged vanes. With reference to FIG. 7B there is illustrated an electron beam weld repaired vane assembly that was subjected to heavy DOD.

Various embodiments of the present invention offer the potential for improvement over prior art. The following discussion of potential improvements is not intended to limit the scope of the claims herein, but merely to illustrate one or more possible benefits that may result from an embodiment of the present invention. Any particular application might include only one, more than one, or all of these improvements. Potential improvements include: (1) lightweight low cost fixed vane system; (2) improved ovalization control; (3) cast approach allows for unrestricted airfoil geometry; (4) minimization of part count; (5) elimination of endwall recirculation; (6) minimization of flange leakage; (7) permitting incorporation of various material systems; (8) permitting incorporation of flow control technologies; and, (9) local case features such as borescope ports, bleed manifolds, instrumentation bosses, etc. are readily incorporated into the casting.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method of forming a gas turbine engine component, the method comprising:
   casting, as a single article, a circular shaped vane casing segment of a gas turbine engine case having an outer case wall, a plurality of airfoils extending from a lower surface of said outer case wall, and an inner shroud extending from a lower portion of said plurality of airfoils;
   plasma spraying an abradable surface on a lower surface of an extension of the outer case wall; and
   forming a feed through aperture and cavity in the outer case wall concurrent with the casting as a single article.

2. The method of claim 1, further comprising:
   wherein casting includes forming a flange;
   pressing said circular shaped vane casing segment with a hot isostatic pressing operation to eliminate any voids in said circular shaped vane casing segment; and
   lathe turning an outside surface of said flange, an inside diameter of said inner shroud, and an inside diameter of a forward extension of said circular shaped vane casing segment.

3. The method of claim 1, further comprising:
   integrally forming a first and second flange extending upwardly from opposing ends of said outer case wall; and
   drilling a plurality of apertures circumferentially around said flanges.

4. The method of claim 1, further comprising cutting a split between respective airfoils.

* * * * *